United States Patent
Fairgrieve et al.

(10) Patent No.: US 11,904,527 B2
(45) Date of Patent: Feb. 20, 2024

(54) LARGE DIAMETER FEEDSTOCK FOR EXTRUSION-BASED ADDITIVE MANUFACTURING

(71) Applicant: Universal Fibers, Inc., Bristol, VA (US)

(72) Inventors: Stuart P. Fairgrieve, Kidlington (GB); Robert Leon Nelson, Bristol, TN (US); Logan Michael Pensinger, Bristol, VA (US)

(73) Assignee: Universal Fibers, Inc., Bristol, VA (US)

( * ) Notice: Subject to any disclaimer, the term of this patent is extended or adjusted under 35 U.S.C. 154(b) by 192 days.

(21) Appl. No.: 17/028,619

(22) Filed: Sep. 22, 2020

(65) Prior Publication Data

US 2021/0086437 A1 Mar. 25, 2021

Related U.S. Application Data

(60) Provisional application No. 62/904,341, filed on Sep. 23, 2019.

(51) Int. Cl.
*B29C 64/118* (2017.01)
*B33Y 70/00* (2020.01)
*B33Y 10/00* (2015.01)

(52) U.S. Cl.
CPC .... *B29C 64/118* (2017.08); *B29K 2995/0097* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | |
|---|---|---|
| 5,162,074 A | 11/1992 | Hills |
| 6,783,854 B2 | 8/2004 | Bond |
| 2016/0012935 A1* | 1/2016 | Rothfuss .................. H01B 1/22 264/308 |
| 2018/0007892 A1* | 1/2018 | Farrugia .................. H01B 1/22 |
| 2018/0162048 A1* | 6/2018 | Gibson ................ C09D 123/12 |
| 2018/0304532 A1* | 10/2018 | Burnham .............. B29C 64/209 |
| 2020/0139694 A1* | 5/2020 | Armijo .................. B33Y 30/00 |
| 2021/0206050 A1* | 7/2021 | Sinha ........................ D01F 8/10 |

* cited by examiner

*Primary Examiner* — Jeffrey D Washville
(74) *Attorney, Agent, or Firm* — Hovey Williams LLP; Kameron D. Kelly

(57) ABSTRACT

Feedstocks are provided for use in the additive manufacturing of three-dimensional objects via extrusion-based techniques, such as Fused Filament Fabrication ("FFF") or Fused Deposition Modeling ("FDM"). Generally, the feedstocks may be in the form of substantially continuous filaments and/or in the form of rods of specified length, with diameters in excess of 3.5 mm.

13 Claims, No Drawings

LARGE DIAMETER FEEDSTOCK FOR EXTRUSION-BASED ADDITIVE MANUFACTURING

RELATED APPLICATIONS

This application claims the priority benefit under 35 U.S.C. § 119(e) of U.S. Provisional Patent Application Ser. No. 62/904,341 entitled "LARGE DIAMETER FEEDSTOCK FOR EXTRUSION-BASED ADDITIVE MANUFACTURING," filed Sep. 23, 2019, the entire disclosure of which is incorporated herein by reference.

BACKGROUND

1. Field of the Invention

The present invention is generally concerned with feedstocks for use in the additive manufacturing of three-dimensional ("3D") objects via extrusion-based techniques.

2. Description of the Related Art

Additive manufacturing, or 3D printing, is a recently developed and fast-growing field, in which 3D objects are prepared by adding together, by various techniques, layers of material to build the desired 3D object in an additive manner. This approach differs markedly from more established methods of making 3D objects, which may be referred to as subtractive manufacturing, in which a block of a starting substance has material removed therefrom, using any suitable technique, until the desired 3D object is left.

A particular technique in the field of additive manufacturing uses an extrusion process to lay down "roads" of material to form successive layers, via a controlled extruder head, in order to build up a 3D object. This method is commonly referred to as Fused Filament Fabrication ("FFF") or Fused Deposition Modeling ("FDM").

Material used in the FFF or FDM processes and devices is usually in one of two forms. The first form is that of a bulk material, such as powder or pellets; however, such forms are normally limited to 3D printing processes associated with large objects and situations where the build area is essentially unrestricted, such as the so-called Big Area Additive Manufacturing ("BAAM") process. The second form, and the one most commonly used in the majority of commercial and developmental extrusion-based 3D printers where a limited size build chamber is often present, is that of substantially continuous build material filaments.

While existing filamentary feedstocks are adequate for many additive manufacturing tasks, especially the manufacture of smaller and/or more detailed objects, the low rate of material deposition associated with such feedstocks may result in unacceptably extended build times in the case of larger objects. Furthermore, the low thickness of printed roads and associated material layers derived from these feedstocks may be unnecessary in objects that do not require fine detail.

In the case of such larger objects, or parts of any object which do not require fine detail, it would be useful to have a feedstock which allows for decreased build times associated with the deposition of wider extruded roads and/or thicker individual layers in the construction of the 3D object. Ideally, such an approach could use current filament-fed, extrusion-based additive manufacturing devices and processes, either as they stand or with limited modification.

Thus, there is a need in the industry for extrusion-based additive manufacturing feedstocks of a type suitable for use in 3D printing processes between those served by current thin filaments and by bulk material supply.

SUMMARY

One or more embodiments of the present invention generally concern a feedstock for extrusion-based additive manufacturing devices and processes. Generally, the feedstock comprises continuous filaments and/or rods of a specified length, wherein the filaments and rods have an average diameter of at least 3.5 mm.

One or more embodiments of the present invention generally concern a feedstock for extrusion-based additive manufacturing devices and processes. Generally, the feedstock comprises continuous filaments and/or rods of a specified length, wherein the filaments and rods have an average diameter of 4 to 15 mm and the rods have a length in the range of 100 to 2,000 mm.

One or more embodiments of the present invention generally concern an extrusion-based additive manufacturing process. Generally, the process involves: (i) providing a feedstock comprising one or more continuous filaments, one or more rods of a specific length, or a combination thereof, wherein the filaments and rods have an average diameter of at least 3.5 mm; and (ii) subjecting the feedstock to additive manufacturing to thereby produce a three-dimensional object.

DETAILED DESCRIPTION

The present invention is generally concerned with feedstocks for use in the additive manufacturing of three-dimensional objects via extrusion-based techniques, such as Fused Filament Fabrication ("FFF") or Fused Deposition Modeling ("FDM"). As discussed below in greater detail, the feedstocks may be in the form of substantially continuous filaments and/or in the form of rods of specified lengths. Furthermore, in various embodiments, the filaments and/or rods may have average diameters in excess of 3.5 mm, such as average diameters in the range of 5 to 15 mm; thus, the inventive filaments and rods may comprise diameters that are larger relative to existing filaments used in the art.

Representative, but non-limiting, examples of embodiments of the present invention include the following disclosed additive manufacturing feedstocks, filaments, and rods; however, it should be noted that the following embodiments are not mutually exclusive to each other and may be combined in any combination as long as such combination does not contradict any feature of the disclosed embodiments.

In various embodiments, the inventive feedstocks may comprise, consist essentially of, or consist of at least one substantially continuous filament and/or of at least one rod of a specified length. In the latter case, the rods may be substantially straight and have a length of at least 10, 25, 50, 75, or 100 mm and/or less than 5,000, 4,000, 3,000, 2,000, 1,500, or 1,000 mm. In certain embodiments, the rods may comprise lengths in the range of 10 to 5,000 mm, 25 to 4,000 mm, 50 to 2,000 mm, 75 to 1,500, or 100 to 1,000 mm.

In various embodiments, the filaments and/or rods may have an average diameter of at least 3.5, 3.6, 3.7, 3.8, 3.9, 4, 4.1, 4.2, 4.3, 4.4, 4.5, 4.6, 4.7, 4.8, 4.9, or 5 mm and/or less than 25, 20, 15, 14, 13, 12, 11, 10, 9, 8, or 7 mm. In certain embodiments, the filaments and/or rods may comprise average diameters in the range of 5 to 15 mm, 4 to 10 mm, or 5 to 7 mm.

In one or more embodiments, the inventive feedstock may comprise at least 50, 60, 70, 80, 90, 95, or 99 weight percent of at least at least one substantially continuous filament and/or at least one rod of a specified length, as based on the total weight of the feedstock.

In one or more embodiments, the inventive feedstock may comprise a plurality of the filaments and/or rods.

The filaments and rods forming the inventive feedstock material may be produced with any material suitable for use in an extrusion-based additive manufacturing device or process. Exemplary materials include, but are not limited to, polymers, composites, metals, and ceramics.

In various embodiments, the filaments and rods forming the inventive feedstock material may comprise, consist essentially of, or consist of one or more polymers, such as thermoplastic polymers. Exemplary thermoplastic polymers may include, but are not limited to, polyolefins, polyacrylates, polyvinyls, styrenics, aromatic polyesters, aliphatic polyesters, polyamides, polycarbonates, polyarylene oxides, polyarylene sulfides, poluysulfones, polyaryletherketones, polyurethanes, thermoplastic elastomers, silicones, or combinations thereof. The thermoplastic polymers may be derived from petrochemical or renewable resources, and/or may be in the form of virgin or recycled materials. In one or more embodiments, the filaments and rods forming the inventive feedstock material may comprise at least 50, 60, 70, 80, 90, 95, or 99 weight percent of one or more thermoplastic polymers.

In various embodiments, the filaments and rods forming the inventive feedstock material may comprise, consist essentially of, or consist of a polyester, a polyamide (e.g., Nylon 6, Nylon 66, or Nylon 12), a poly(lactic) acid, a polycarbonate, or a combination thereof. In certain embodiments, the filaments and rods forming the inventive feedstock material may comprise at least 50, 60, 70, 80, 90, 95, or 99 weight percent of a polyester, a polyamide (e.g., Nylon 6, Nylon 66, or Nylon 12), a poly(lactic) acid, a polycarbonate, or a combination thereof.

In various embodiments, the inventive feedstock, and/or the filaments and rods therein, may comprise one or more carbon-containing additives, such as a carbon fiber. In one or more embodiments, the inventive feedstock, and/or the filaments and rods therein, may comprise at least 0.1, 0.5, 1, 2, 3, 4, or 5 and/or less than 40, 30, 25, 20, 15, or 10 weight percent of one or more carbon-containing additives.

In various embodiments, the inventive feedstock, and/or the filaments and rods therein, may comprise one or more additives. Exemplary additives may include, but are not limited to, particulate reinforcing agents, fibrous reinforcing agents, colorants, fire retardants, antimicrobials, processing aids, impact modifiers, antioxidants, light stabilizers, antistatic agents, electrically conductive materials, thermally conductive materials, and nucleating agents. In one or more embodiments, the inventive feedstock, and/or the filaments and rods therein, may comprise at least 0.1, 0.5, 1, 2, 3, 4, or 5 and/or less than 40, 30, 25, 20, 15, or 10 weight percent of one or more additives.

In various embodiments, the inventive filaments and/or rods may comprise, consist essentially of, or consist of a single monocomponent material. Alternatively, in various embodiments, the inventive filaments and/or rods may comprise, consist essentially of, or consist of several layers containing at least 2, 3, 4, or 5 different materials, such as two different types of thermoplastic polymers. In such embodiments, the filaments and/or rods may comprise a multicomponent configuration, such as a concentric core-sheath configuration. In one or more embodiments, the filaments and/or rods may comprise of at least 2, 3, 4, or 5 concentric layers and/or less than 50, 40, 30, 20, 15, or 10 concentric layers. In such embodiments, the layers may comprise the same or different formulations.

In various embodiments, the filaments and/or rods may comprise any suitable cross-sectional shape including, but not limited to, round, oval, polygonal, square, and rectangular. In certain embodiments, the filaments and/or rods may comprise a round cross-sectional shape.

The inventive filaments and/or rods may be manufactured using any suitable technique including, but not limited to, extrusion, pultrusion, molding, and casting. In certain embodiments, the inventive filaments and/or rods are manufactured using an extrusion process, either by monocomponent extrusion or by multicomponent extrusion. Equipment and processes for achieving such manufacture is well known to those skilled in the art. Exemplary melt extrusion equipment and techniques are described in U.S. Pat. Nos. 5,162,074 and 6,783,854, the disclosures of which are incorporated herein by reference in their entireties.

When the inventive feedstocks comprise the filaments described herein, the inventive feedstocks may be supplied via reels of suitable sizes and utilized accordingly in the extrusion-based additive manufacturing device or process. In such embodiments, the feedstock may be supplied from the reel to the device print head using known conveying equipment associated with current devices and processes, or modified versions thereof.

When the inventive feedstocks comprise the rods described herein, the inventive feedstocks may be supplied, and utilized in the extrusion-based manufacturing device or process, in the form of individual rods or bundles of rods. The feedstock may be supplied to the device print head using any suitable conveying method known to those skilled in the art. In certain embodiments, the rods may be supplied to the device print head manually and/or via an automated feeder that automatically feeds the rods into the print head.

The inventive feedstocks described herein may be utilized in extrusion-based additive manufacturing systems and processes, such as those described in U.S. Pat. No. 8,920,697, the entire disclosure of which is incorporated herein by reference in its entirety.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

3D printer filaments according to the present invention were produced using standard single-screw extrusion equipment and techniques known to those skilled in the art. The specific types of filaments and their compositions are outlined in TABLE 1, below.

TABLE 1

| Filament Composition | Average Diameter (mm) |
| --- | --- |
| Polylactic Acid (Ingeo Biopolymer 4043D) | 6.0009 |
| Nylon 6/66 (Phoenix PA6/66) | 6.0 |
| Nylon 12 (95 wt. %) and Carbon Fiber (5 wt. %) | 6.0 |
| Polycarbonate (90 wt. %) and Carbon Fiber (10 wt. %) | 6.2 |
| High Temperature Nylon (Luvocom 3F PAHT 9875) | 5.9075 |
| High Temperature Nylon (Luvocom 3F PAHT 9875) | 6.0138 |

All of the above filaments were collected as continuous diameter filaments and were observed to exhibit diameter variation and degree of roundness within the required specifications of additive manufacturing. Furthermore, all of the above filaments were successfully tested and used in additive manufacturing settings.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A feedstock for an extrusion-based additive manufacturing process, said feedstock comprising one or more continuous filaments, one or more rods of a specific length, or a combination thereof, wherein said filaments and said rods have an average diameter of at least 3.5 mm, wherein said filaments and said rods are formed from a polyester, a polyamide, a polycarbonate, or a combination thereof, wherein said filaments and said rods have a monocomponent configuration.

2. The feedstock according to claim 1, wherein said filaments and said rods have an average diameter of 4 to 15 mm.

3. The feedstock according to claim 1, wherein said filaments and said rods have an average diameter of 4 to 7 mm.

4. The feedstock according to claim 1, wherein said filaments and said rods have an average diameter of 5 to 7 mm.

5. The feedstock according to claim 1, wherein said feedstock comprises said filaments, wherein said filaments consist of said polyester, said polyamide, or said polycarbonate.

6. The feedstock according to claim 1, wherein said feedstock comprises said rods, wherein said rods have a length in the range of 100 to 1,000 mm, wherein said rods consist of said polyester, said polyamide, or said polycarbonate.

7. The feedstock according to claim 1, wherein said feedstock consists of said filaments, said rods, or a combination thereof.

8. A feedstock for an extrusion-based additive manufacturing process, said feedstock consisting of one or more continuous filaments, one or more rods of a specific length, or a combination thereof,
   wherein said filaments and said rods have an average diameter of 4 to 15 mm,
   wherein said rods have a length in the range of 100 to 2,000 mm,
   wherein said filaments and said rods consist of a polyester, a polyamide, a polycarbonate, or a combination thereof,
   wherein said filaments and said rods have a monocomponent configuration.

9. The feedstock according to claim 8, wherein said filaments and said rods have an average diameter of 5 to 7 mm.

10. An additive manufacturing process comprising:
   (i) providing a feedstock comprising one or more continuous filaments, one or more rods of a specific length, or a combination thereof, wherein said filaments and said rods have an average diameter of at least 3.5 mm, wherein said filaments and said rods are formed from a polyester, a polyamide, a polycarbonate, or a combination thereof, wherein said filaments and said rods have a monocomponent configuration; and
   (ii) subjecting said feedstock to additive manufacturing to thereby produce a three-dimensional object.

11. The additive manufacturing process according to claim 10, wherein said additive manufacturing comprises Fused Filament Fabrication or Fused Deposition Modeling.

12. The feedstock according to claim 1, wherein said filaments and said rods consist of said polyamide, wherein said filaments and said rods have an average diameter of 5 to 7 mm.

13. The feedstock according to claim 8, wherein said filaments and said rods consist of said polyamide, wherein said filaments and said rods have an average diameter of 5 to 7 mm.

* * * * *